US012300098B2

(12) United States Patent
Chen (10) Patent No.: US 12,300,098 B2
(45) Date of Patent: *May 13, 2025

(54) METHODS AND SYSTEMS FOR AMBIENT SYSTEM CONTROL (71) Applicant: Comcast Cable Communications, LLC, Philadelphia, PA (US)

(72) Inventor: Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/703,597

(22) Filed: Dec. 4, 2019

(65) Prior Publication Data

US 2020/0219384 A1 Jul. 9, 2020

Related U.S. Application Data (63) Continuation of application No. 13/686,080, filed on Nov. 27, 2012, now Pat. No. 10,565,862.

(51) Int. Cl.
*G08C 23/04* (2006.01)
*G08C 17/02* (2006.01)
*G10L 15/20* (2006.01)
*G10L 15/28* (2013.01)
*G10L 15/30* (2013.01)
*G10L 15/32* (2013.01)

(52) U.S. Cl.
CPC ............ *G08C 23/04* (2013.01); *G08C 17/02* (2013.01); *G10L 15/20* (2013.01); *G10L 15/28* (2013.01); *G10L 15/30* (2013.01); *G10L 15/32* (2013.01)

(58) Field of Classification Search
CPC .... G08C 23/04; G08C 17/02; G08C 2201/31; G08C 2201/12; G10L 15/20; G10L 15/28; G10L 15/30; G10L 15/32; G10L 2015/223; G10L 25/78
USPC .................................................. 367/197, 198
See application file for complete search history.

(56) References Cited

U.S. PATENT DOCUMENTS

| | | | |
|---|---|---|---|
| 5,267,323 A * | 11/1993 | Kimura | G08C 23/04 381/110 |
| 5,410,326 A | 4/1995 | Goldstein | |
| 6,021,179 A | 2/2000 | Lee | |
| 6,507,306 B1 | 1/2003 | Griesau et al. | |
| 6,760,850 B1 | 7/2004 | Atkinson et al. | |
| 6,906,635 B1 | 6/2005 | Moutaux et al. | |
| 7,039,590 B2 | 5/2006 | Luchaup | |
| 7,117,377 B2 | 10/2006 | Hagiwara et al. | |
| 7,492,248 B1 | 2/2009 | Bjorkland et al. | |
| 7,519,534 B2 * | 4/2009 | Maddux | G06Q 30/02 704/255 |
| 8,219,835 B1 | 7/2012 | Uhlhorn | |

(Continued)

OTHER PUBLICATIONS

U.S. Appl. No. 13/686,080 (U.S. Pat. No. 10,565,862), filed Nov. 27, 2012 (Feb. 18, 2020), Michael Chen.

(Continued)

*Primary Examiner* — Mohamed Barakat
(74) *Attorney, Agent, or Firm* — Ballard Spahr LLP (57) ABSTRACT

Provided are methods and systems for ambient system control, comprising multiple detection devices with varying levels of detection capability. The methods and systems contemplate the use of both voice and gesture commands, as well as other inputs, for system control.

20 Claims, 5 Drawing Sheets

(56) References Cited

U.S. PATENT DOCUMENTS

| | | | |
|---|---|---|---|
| 8,432,264 B1 | 4/2013 | Hsu | |
| 10,565,862 B2* | 2/2020 | Chen | G08C 23/04 |
| 2002/0044199 A1 | 4/2002 | Barzebar et al. | |
| 2002/0072905 A1* | 6/2002 | White | G10L 15/30 |
| | | | 704/231 |
| 2002/0126035 A1* | 9/2002 | Hou | G08C 23/04 |
| | | | 340/12.54 |
| 2003/0105637 A1* | 6/2003 | Rodriguez | G10L 19/008 |
| | | | 704/270 |
| 2004/0128137 A1* | 7/2004 | Bush | G06F 3/167 |
| | | | 704/275 |
| 2004/0135686 A1 | 7/2004 | Parker | |
| 2006/0074686 A1* | 4/2006 | Vignoli | G10L 21/0272 |
| | | | 704/275 |
| 2006/0170548 A1 | 8/2006 | Leen | |
| 2007/0124608 A1 | 5/2007 | Knowlson et al. | |
| 2007/0140199 A1 | 6/2007 | Zhao et al. | |
| 2007/0242839 A1 | 10/2007 | Kim et al. | |
| 2008/0209086 A1 | 8/2008 | Portele et al. | |
| 2008/0240105 A1 | 10/2008 | Abdallah | |
| 2008/0262657 A1 | 10/2008 | Howell et al. | |
| 2008/0312935 A1 | 12/2008 | Mau, II | |
| 2009/0043580 A1* | 2/2009 | Mozer | G10L 15/26 |
| | | | 704/251 |
| 2009/0217307 A1 | 8/2009 | Ooe | |
| 2010/0110952 A1 | 5/2010 | Diab | |
| 2010/0131280 A1 | 5/2010 | Bogineni | |
| 2010/0169677 A1 | 7/2010 | Madhusoodanan | |
| 2010/0169945 A1 | 7/2010 | Kennedy et al. | |
| 2010/0271252 A1* | 10/2010 | Musschebroeck | G08C 17/02 |
| | | | 341/176 |
| 2012/0078635 A1 | 3/2012 | Rothkopf et al. | |
| 2013/0006638 A1 | 1/2013 | Lindahl | |
| 2013/0029684 A1 | 1/2013 | Kawaguchi et al. | |
| 2013/0070739 A1 | 3/2013 | McCann et al. | |
| 2013/0339028 A1* | 12/2013 | Rosner | H04R 29/004 |
| | | | 704/275 |
| 2014/0146644 A1 | 5/2014 | Chen | |
| 2015/0228274 A1* | 8/2015 | Leppanen | G10L 15/28 |
| | | | 704/243 |
| 2015/0340824 A1 | 11/2015 | Leiba | |

OTHER PUBLICATIONS

Papanicholas, "5 Apps to Improve Android's Sound Quality," Jul. 10, 2012, http://evolver.fm/2012/07/10/5-apps-toimprove-androids-sound-quality/.

Winer, "The Audio Expert: Audio Fidelity, Measurements, and Myths—Part 1," May 2, 2012, https://www.prosoundweb.com/topics/audio/audio_fidelity_measurements_and_myths/.

PhoneArena, "What does phone audio quality depend on," Dec. 12, 2011, https://www.phonearena.com/news/What-doesphone-audio-quality-depend-on_id24620.

T. B. Amin and I. Mahmood, "Speech Recognition using Dynamic Time Warping," 2008 2nd International Conference onAdvances in Space Technologies, Islamabad, 2008, pp. 74-79, http://ieeexplorejeee.org/stamp/stamp.jsp?tp=&arnumber=4747690&isnumber=4747669.

* cited by examiner

METHODS AND SYSTEMS FOR AMBIENT SYSTEM CONTROL

CROSS-REFERENCE TO RELATED APPLICATIONS

This application claims priority under 35 U.S.C. § 120 as a continuation of U.S. Non-Provisional application Ser. No. 13/686,080, filed Nov. 27, 2012, which is herein incorporated by reference in its entirety.

BACKGROUND

Control systems for consumer electronics take many forms, including handheld remote controls, speech recognition, and gesture recognition. Systems have been proposed that utilize "always on" sensors, such as microphones, to receive commands and control an electronic device. These "always on" sensors are low fidelity, subject to significant ambient noise, and mounted in a fixed position (without regard to user positioning). The "always on" sensors are thus incapable of receiving, interpreting, and processing complex commands. The use of high-fidelity sensors provides better command performance and sensor placement, but must rely on constant battery replacement as the power drain in an "always on" environment is nontrivial.

Thus, there is a need for more sophisticated methods and systems for remotely controlling the operation of a device by voice, gesture, or other input.

SUMMARY

It is to be understood that both the following general description and the following detailed description are exemplary and explanatory only and are not restrictive, as claimed. Provided are methods and systems for ambient system control, comprising, in one aspect, detecting a first signal from a source at a first detection device, determining that the signal comprises a first command, activating a second detection device proximate to the source, wherein the second detection device has less available power than the first detection device, detecting a second signal from the source at the second detection device, determining that the second signal comprises a second command, and acting on the second command, such as providing the second command to a target device.

Further provided are methods and systems for ambient system control, comprising, in another aspect, detecting a signal from a source at a first detection device, determining that the signal comprises a command, providing the signal to a second detection device, translating, by the second detection device, the signal into a device instruction, and providing the device instruction to a target device.

Further aspects relate to systems for ambient system control, comprising a target device, a first detection device configured for receiving a command, a second detection device configured for remote activation and for receiving the command; and a remote server, configured for receiving the command from the second detection device, translating the command into a device instruction, and providing the device instruction to the target device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
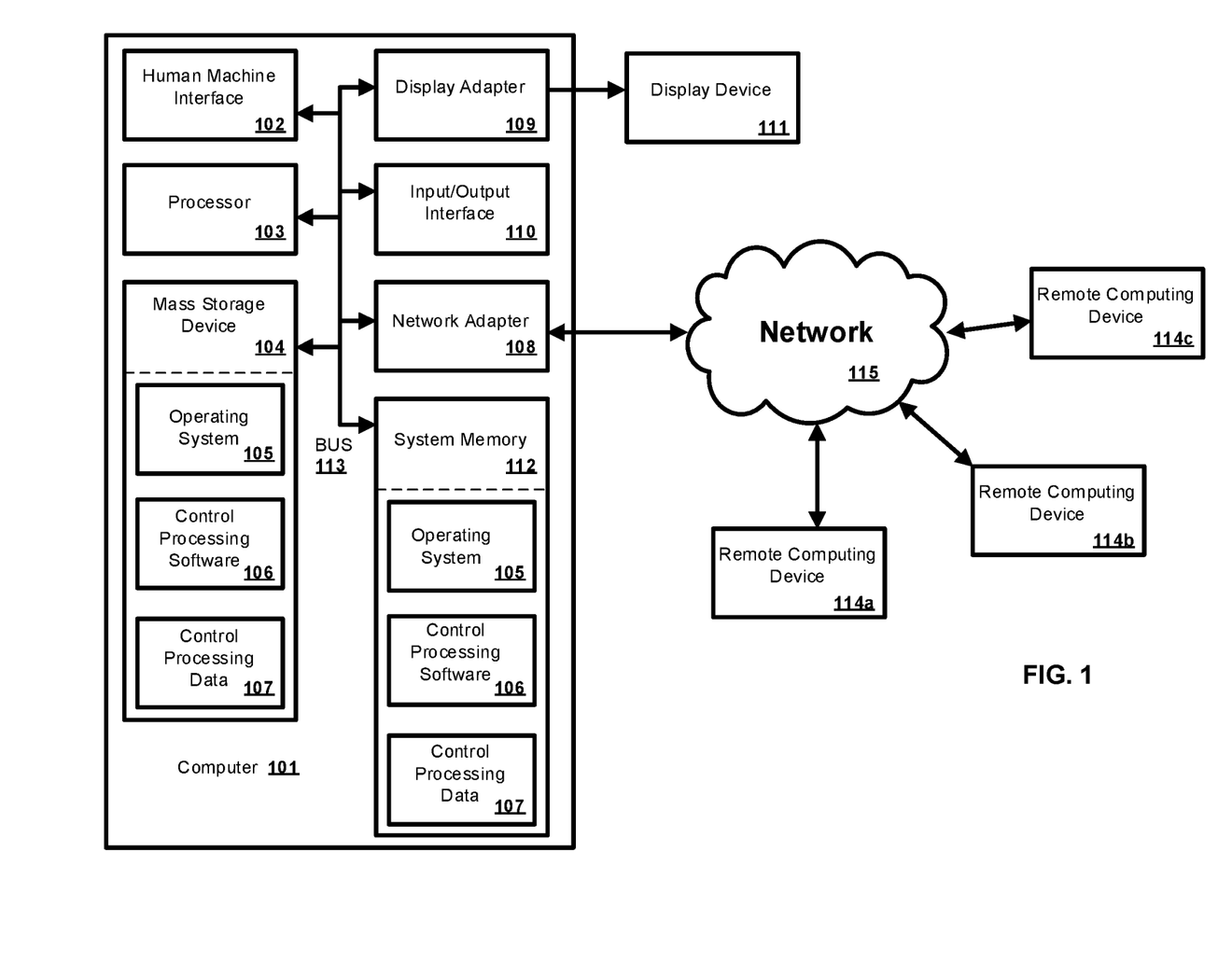
FIG. 1 is an exemplary operating environment.
Figure 2:
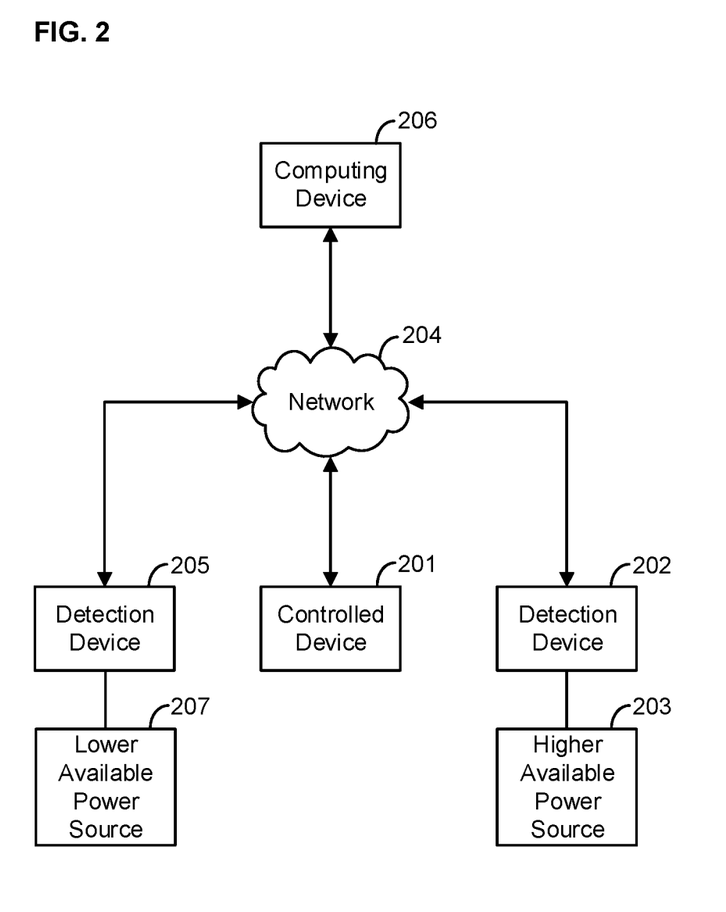
FIG. 2 is another exemplary operating environment.
Figure 3:
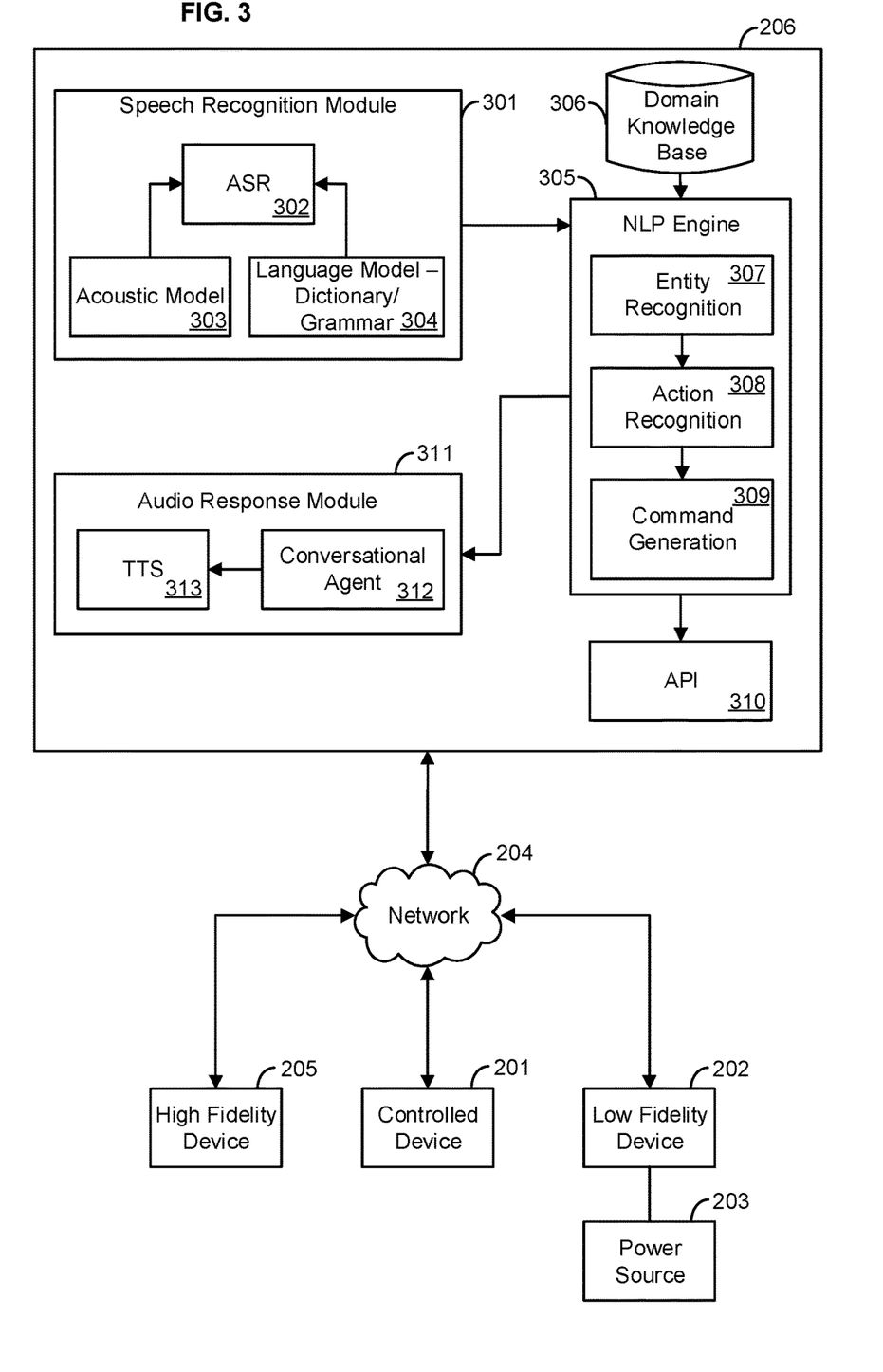
FIG. 3 illustrates functional components of an exemplary computing device and network environment.

FIGS. 1-3 illustrate various aspects of an exemplary system in which the present methods and systems can operate. The present disclosure relates to ambient system control in a multi-device environment. Those skilled in the art will appreciate that present methods may be used in systems that employ both digital and analog equipment. In an aspect, a first sensor can be utilized to determine whether an activation command has been issued by a user. By way of example, the first sensor can be coupled to continuous power, such as a standard power outlet (AC or otherwise) or wired directly into a home or other facility power system. In another aspect, the first sensor can be coupled to a battery, or other non-continuous power source such as solar, wind, or any intermittent or shared power source. In a further aspect, the first sensor can be coupled to a power source with higher available power relative to a power source coupled to a second sensor. By way of further example, the first sensor can be a lower-fidelity sensor. As used herein, lower-fidelity refers to a device configured for lower quality sound and/or gesture recognition capability, relative to a higher-fidelity device which is configured for higher quality sound and/or gesture recognition capability. The first sensor can be positioned without regard to user location in an environment.

An activation command can be, for example, a keyword, a device name, a function name, a gesture, and the like. One or more of several command processing methods can be utilized to process the activation command. For example, a processor can be coupled to the first sensor to process the activation command and any action command associated therewith. An action command can be any phrase or gesture intended to cause a device to perform a function. An action command can be, for example, a command to change a channel, adjust volume, turn on/off, adjust temperature, arm/disarm, retrieve further information, initiate an application, and the like. In another aspect, the activation command can be relayed to a remote computing device, such as a server, for processing.

In a further aspect, the activation command can be provided to a second sensor for processing. By way of example, the second sensor can be coupled to a battery, or other non-continuous power source such as solar (light), wind, or any intermittent or shared power source. In another aspect, the second sensor can be coupled to continuous power, such as coupled to a standard power outlet (AC or otherwise) or wired directly into a home or other facility power system. In a further aspect, the second sensor can be coupled to a power source with lower available power relative to a power source coupled to the first sensor. By way of further example, the second sensor can be a higher-fidelity sensor. As used herein, higher-fidelity refers to a device configured for higher quality sound and/or gesture recognition capability, relative to a lower-fidelity device which is configured for lower quality sound and/or gesture recognition capability.

One or more of several methods can be utilized to recognize the activation command As an example, a time-based subdivision method can be used for digital audio recordings of speech that subdivides the recording into a time-ordered sequence of audio frames in order to compare against previously defined or recorded sequences of audio frames (perhaps normalizing to handle differences in overall volume). Another method can comprise further decomposing each frame (which may potentially overlap) into vectors of numeric values, each of which represents the magnitude and perhaps phase of responses from a bank of filters (where the frequency response and spacing of the filters may vary depending on analysis technique). Once this time-varying decomposition and analysis is performed, the resultant vectors of numeric values can be compared, and if the differences between them are determined to be small enough, the activation command can be considered recognized (this can be either as a candidate, or a confirmed command), and this recognition can be conveyed over a cable or network. Furthermore, this pattern can be repeated; for example, a speech utterance may be subdivided into silence-separated portions, and each portion can be analyzed to identify individual phonemes that form an activation command. In other cases, where the presence and strength of various frequencies is more important than the specific time of their occurrence, the above decomposition into vectors of numeric values representing filter bank responses can be done without subdividing into a time-ordered sequence of audio frames first.

In another aspect, the second sensor can enter a low power (standby) mode, or other power conservation state. The second sensor can be activated upon receipt of the activation command at the first sensor. Such activation permits the second sensor to remain in the low power (standby) mode until the need arises to receive a complex voice or gesture command from the user. The second sensor can then receive the voice or gesture command and determine whether an activation and/or action command has been issued by the user. The second sensor can be positioned in close proximity to the user, thus contributing to higher resolution sensing.

In an aspect, the second sensor can be connected to a wired and/or wireless control network (for example, a personal area network, a local area network, or a wide area network, depending on the device). As a candidate or confirmed activation command is recognized, instructions can be conveyed to the second sensor to start a higher-fidelity capture so that finer discrimination of more complex utterances can be performed with better chances of successful recognition. In some cases these instructions can be conveyed as a "push" notification that the sensor is still actively listening for while in low power mode, for example to begin capturing and analyzing the higher-fidelity input. In other cases the instructions may be conveyed in a "pull" fashion, for example if the second sensor is performing fractional duty cycles and polls for recent data when it wakes. In cases where the activation command is recognized as a candidate but has not been confirmed, its data and/or essential properties may be conveyed, as in configurations where the second sensor also contains filtering and/or processing elements that can assist in confirmation. In a further aspect, the system can be configured for both recognition (what was said) and discrimination (who said it) of voice and/or gesture commands. In some instances recognition and discrimination can be used to differentiate between a candidate command and a confirmed command. For example, in the case of parental controls, the system can be configured to turn on or to turn to certain channels upon receipt of a specific phrase, but only when spoken by certain members of the household.

One or more of several command processing methods can be utilized to process the activation and/or action command For example, a processor can be coupled to the second sensor to process the activation and/or action command. In another aspect, activation and/or action commands can be relayed to a remote computing device for processing. In a further aspect, the activation and/or action commands can be provided to the first sensor for processing.

As an example, where the commands are expected to be speech, the system can perform time-based subdivision using a processor coupled to the second sensor, and the resultant audio frames can be relayed to a remote computing device for vectorization and subsequent analysis to provide recognized phonemes. These recognized phonemes can be further processed using dictionary lookups and either constrained grammars or n-gram models, to determine the most probable word phrases. The word phrases can be further parsed, and optionally combined with associated data pertinent to the conversation, to establish one or more device commands and their respective device targets, so that the system can dispatch these commands to be executed appropriately.

As another example, where the commands are expected to be gestures, the system can perform time-based subdivision using a processor coupled to the second sensor, and the resultant images can be provided to a remote computing device for motion estimation and/or other analysis techniques, such as centroid/moment computation and collision detection. Recognized bodies/properties and motions can be assessed against business rules for gesture detection, to establish one or more device commands and their respective device targets, so that the system can dispatch these commands to be executed appropriately.

In a further aspect, the system can discriminately activate one or more specific sensors. The specific sensors being selectively activated can be one or more first and/or second sensors as described herein, with varying combinations of relative power available to each sensor and relative fidelity of each sensor. The system can activate specific sensors associated with a specific user in the event the user issuing the command is identified. Similarly, the system can activate specific sensors proximate to the target device the user wishes to control. For example, if a user issues a command to change the channel on a television in a home with multiple televisions operating at once, the system can determine the location of the user, identify sensors proximate to the user, and identify the television proximate to the user to control. The system can activate specific sensors associated with a specific user to provide complementary information for a given action command referencing that user. In some aspects, access control permissions may be relevant to the execution of such commands. For example, an action command to "Tell me what my son is listening to" may activate a sensor associated with the user corresponding to the son in order to capture relevant audio samples. The system can also activate specific sensors to provide complementary information for a given action command. For example, an action command to "show me more about the song playing downstairs" may activate a sensor to capture audio samples from downstairs. The system can also deactivate specific sensors, as part of execution of an action command, or where the analysis of received input warrants such behavior (e.g., turning off a sensor when too strong a signal is being provided to prevent damage, or when the signal is determined to be essentially identical to that of another sensor and overall battery conservation is desired).

The methods and systems provided herein can be applied to speech and/or gesture recognition. By way of example, in response to a vocal utterance, an always-on device can perform first-level discrimination. Upon identifying utterances to recognize, signals can be sent to one or more additional devices that capture the utterance at a higher resolution (e.g. due to closer proximity to the speaker). The captured utterance can be provided to recognition components to process. Devices with continuous power (e.g. a plugged-in set top box, or a wired home security system sensor) can perform the always-on function of coarse-level gesture and/or "keyword spotting"—for example, to detect utterances that may be the keyword "television." For example, a home security system may have ambient microphones that can be configured to discern voice frequencies and/or basic phonemes that may comprise a keyword.

When a candidate command is detected, that command can be provided to other system components for confirmation (e.g. that the command does in fact match the word "television" with reasonable confidence) and further processing (e.g. further inference about the speaker such as gender/age range/identity, which may be unrelated.

Additional devices (e.g. the speaker's smartphone) can be activated for second level processing. The additional device can be directed to capture the remainder of the candidate command (e.g., with closer proximity and higher fidelity) and send the captured command to system components with more significant processing capabilities, such as full speech recognition. These system components can be local to one of the devices (e.g. in the set-top box, in the home gateway, in the home security system command module, in the smartphone) or remote (e.g. servers in a remote data center, or "the cloud"). This more active stage of processing can be continued for an unspecified interval, for example, until a sufficiently long period of inactivity (timeout), or until an explicit command is sent to discontinue and return to first-stage processing. In an aspect, this second level recognition processing can be performed optimistically (e.g., once a candidate command is detected, but before the candidate command is confirmed to have the correct keyword) or pessimistically (e.g., not until the candidate command is confirmed to have the correct keyword and/or be uttered by a valid speaker).

The methods and systems provided thus create an advantage in a multi-device scenario to enable ambient voice control without undue disruption to the battery life and/or performance of close-proximity mobile devices. An analogous system can be implemented to process gesture commands.

One skilled in the art will appreciate that provided herein is a functional description and that the respective functions can be performed by software, hardware, or a combination of software and hardware. In an exemplary aspect, the methods and systems can be implemented on a computer 101 as illustrated in FIG. 1 and described below. By way of example, computing device 206 of FIGS. 2 and 3 can be a computer as illustrated in FIG. 1. Similarly, the methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, control processing software 106, control processing data 107, a network adapter 108, system memory 112, an Input/Output Interface 110, a display adapter 109, a display device 111, and a human machine interface 102, can be contained within one or more remote computing devices 114a, b, c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as control processing data 107 and/or program modules such as operating system 105 and control processing software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and control processing software 106. Each of the operating system 105 and control processing software 106 (or some combination thereof) can comprise elements of the programming and the control processing software 106. Control processing data 107 can also be stored on the mass storage device 104. Control processing data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like. The display 111 and computer 101 can be part of one device, or separate devices.

The computer 101 can operate in a networked environment using logical connections to one or more remote computing devices 114*a, b, c*. By way of example, a remote computing device can be a personal computer, portable computer, smartphone, a server, a router, a network computer, a peer device or other common network node, and so on. Logical connections between the computer 101 and a remote computing device 114*a, b, c* can be made via a network 115, such as a local area network (LAN) and/or a general wide area network (WAN). Such network connections can be through a network adapter 108. A network adapter 108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of control processing software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

In an aspect, illustrated in FIG. 2, provided are systems for ambient system control. Controlled device 201 can be any device capable of being remotely controlled. For example, controlled device 201 can be a television, a set top box, a DVR, a radio, a security system, a climate control system, and the like. Controlled device 201 can be connected to network 204 for communicating with other system components, such as by receiving device instructions and communicating device status. Detection device 202 can be any sensor capable of detecting a command from a user. For example, detection device 202 can be a microphone, a camera (such as an ambient 3D camera), and the like. In an aspect, detection device 202 can be powered by a higher available power source 203 to enable "always on" detection of user commands Higher available power source 203 can be continuous power, such as a standard power outlet (AC or otherwise) or wired directly into a home or other facility power system. Higher available power source 203 can be higher in available power relative to lower available power source 207. In a further aspect, detection device 202 can be coupled to a power source having a higher available power relative to other devices in the system, for example, detection device 205. In an aspect, detection device 202 can be configured for lower fidelity detection relative to other devices in the system, for example, detection device 205. Detection device 202 can be connected to network 204 for communicating with other system components, such as communicating user commands and transmitting activation signals. In an aspect, detection device 202 can be situated without regard to user location.

Detection device 205 can be any sensor capable of detecting a command from a user. For example, detection device 205 can be a smartphone, a PDA, a computer, a camera, and the like. In a further aspect, detection device 205 can be coupled to a lower available power source 207. Lower available power source 207 can be lower in available power relative to higher available power source 203. In an aspect, lower available power source 207 can be battery power, solar power, wind power, intermittent power, shared power, or a combination thereof. Lower available power source 207 can comprise lower available power relative to other devices in the system, for example, detection device 202. In an aspect, detection device 205 can be configured for higher fidelity detection relative to other devices in the system, for example, detection device 202. Detection device 205 can be connected to network 204 for communicating with other system components, such as communicating user commands and receiving activation signals. In an aspect, detection device 205 can be situated proximate to a user location.

Network 204 can be wired and/or wireless and can be one or more of a local area network (LAN), a wide area network (WAN), and the like. In an aspect, network 204 can be the Internet. In a further aspect, network 204 can be a local area network connected to the Internet. In a further aspect, system components can communicate directly, either through wired or wireless connections, without the use of a network.

Computing device 206, such as a server, can be a remote computer connected to network 204 for communicating with other system components, such as receiving user commands, transmitting activation signals, and transmitting device instructions. FIG. 3 provides further detail regarding the functionality of computing device 206. A speech recognition module 301 can accept audio input and can output annotated text that has been recognized. The speech recognition module 301 can be constructed as one or more pieces of automated speech recognition (ASR) software 302, configured with an acoustic model 303 containing analysis data, parameters and characterizations that determine various phonemes or other audio elementary blocks, and also a language model 304 containing a dictionary of distinguishable phoneme combinations to form words and/or phrases, and optionally a grammar or statistical model that stipulates the acceptance probability for various combinations of them. These annotations may comprise one or more of, but are not limited to: amplitude and/or phase; pitch/frequency center and/or range (or a parametric representation of the distribution across multiple); timestamp and/or time zone information; physical location and/or network address where applicable; sensor device; associated service account; associated user; current service authentication/entitlement state where applicable. A natural language processing (NLP) engine 305 can accept text, optionally with these annotations, and can output a data representation of recognized action commands for subsequent dispatch and execution. This NLP engine 305 can be constructed from: one or more domain knowledge bases 306, that provide business rules and data that define relevant entities, actions and syntax for a given command domain (e.g. broadcast television); optional conversational context, that holds state data from previously received and executed activation and/or action commands that are relevant to the current conversation (not shown); entity recognition software 307, that applies information provided in domain knowledge bases and/or optional conversational context to recognize entities that may appear within commands (e.g. television channels/networks); action recognition software 308, that applies information provided in domain knowledge bases and/or optional conversational context to recognize actions that may appear within commands; command generation software 309, that applies defined syntax and other information provided in domain knowledge bases and/or optional conversational context to form action commands, including the specific actions, entities, and targets as well as feedback (text, audio, etc.) to be provided in response. The data representations of these action commands can be processed by one or more application programming interfaces (API) 310 that dispatch action commands for execution. In the case of a system with audio feedback, the commands can be further processed by a module 311 that assembles an audio response. This audio response module can be constructed from: a conversational agent 312, that provides a more natural, human-sounding script from the pure data representation (e.g. data representing a response of 68 degrees Fahrenheit can be embellished into a script to say "That's typical room temperature, which is sixty eight degrees Fahrenheit); and a text-to-speech (TTS) module 313, configured with voice model data to synthesize the actual sound of a human voice from the provided script. The execution of these action commands may also create or modify state data to be preserved in the conversational context, which may be referenced in subsequent commands (e.g. the data representing 68 degrees Fahrenheit can be preserved in context of the conversation, so that a later command to "make it a degree warmer than that" can satisfy the pronoun reference). In some aspects, one or more of the audio response module 311, the conversational agent 312, TTS module 313, can be located external to the server 206, for example, when the system delivers responses via SMS text or web snippet.

Figure 4:
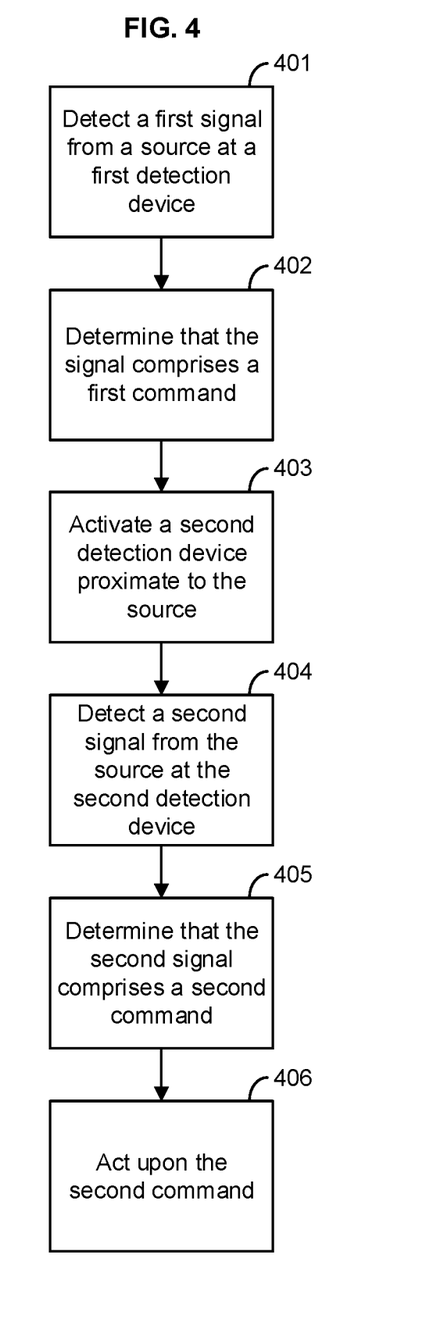
FIG. 4 is an exemplary process flowchart.

In an aspect, illustrated in FIG. 4, provided are methods for ambient system control, comprising detecting a first signal from a source at a first detection device at 401, determining that the signal comprises a first command at 402, activating a second detection device proximate to the source at 403, detecting a second signal from the source at the second detection device at 404, determining that the second signal comprises a second command at 405, and acting upon the second command at 406. In an aspect, the first signal can comprise one or more of a first audio signal and/or a first gesture signal and the second signal can comprise one or more of a second audio signal and/or a second gesture signal.

The first signal can comprise an activation command, an action command, or combination thereof. Determining that the first signal comprises a first command can comprise comparing the first signal to a set of activation commands. In an aspect, an activation command can comprise, for example, an audio signal representing a product brand name, a company name, specific musical melodies and jingles, and the like. Care can be taken when choosing activation commands to ensure that they are recognizable when deliberately uttered or gestured, but not easily mistakenly detected. Other examples of potential activation commands include: a finger snap, distinguished by synchronized detection of both its finger movement and its distinct sound; large body movements (such as standing up, sitting down, and the like); and small body movements (such as hand gestures, head nods, and the like). In an aspect, an action command can comprise changing a channel, changing the volume, requesting the display of more information about content consumed, requesting desired information about a topic, interacting with a guide, turning a system on and/or off, recording content, initiating communication (e.g., phone call, text message, e-mail, and the like), ordering goods or services, invoking features or applications, enabling entitlements, authorizing information exchanges, verifying authenticity, indicating interest in or otherwise annotating, distinguishing or identifying a range of content, and the like. In an aspect, the first detection device can be connected to a continuous power source. In another aspect, the first detection device can be coupled to a power source having a higher available power relative to other devices in the system, for example, higher available power than a second detection device. In an aspect, the first detection device can comprise a plurality of detection devices. The plurality of detection devices can comprise a mixture of devices, such as both a microphone and a camera, and the like. In an aspect, the first detection device can be configured for lower quality sound and/or gesture recognition capability, relative to a second detection device.

In an aspect, activating a second detection device can comprise causing the second detection device to exit a low power (standby) mode. Activating a second detection device proximate to the source can comprise determining a second device proximate to the source. Determining the second detection device proximate to the source can comprise identifying a user issuing a command and activating devices associated with the user, such as predetermined by the user. In another aspect, determining the second detection device proximate to the source can comprise activating one or more devices known to be in the vicinity of the target device. Activating a second detection device proximate to the source can further comprise activating one or more of, a microphone, a motion sensor, or a camera in the second detection device.

In an aspect, the second detection device can be battery powered. In a further aspect, the second detection device can be coupled to a power source having a lower available power relative to other devices in the system, for example, the second detection device can have lower available power than the first detection device. The second detection device can comprise a plurality of devices. The plurality of devices can comprise a mixture of devices, such as both a smartphone and a camera, and the like. The second detection device can be one or more of a remote control, a smartphone, a battery powered microphone, a camera, a portable computer, and the like. The second detection device can be configured to enter into a low power (standby) mode in order to conserve available power. In an aspect, the second detection device can be configured for higher quality sound and/or gesture recognition capability, relative to the first detection device.

Determining that the second signal comprises a second command can comprise analyzing the second signal at one or more of the first detection device, the second detection device, a remote computing device, or a combination thereof. In an aspect, the remote computing device can be a server connected to one or more of the target device, first detection device, and/or second detection device by way of a network connection. The network can be wired or wireless. In an aspect, the network can be the Internet.

In an aspect, acting upon the second command can comprise providing the second command to a target device. Providing the second command to a target device can comprise identifying a target device based one or more of the first or second command The target device can comprise one or more of a computing device and/or display device, such as a computer, laptop, TV, DVR, set top box, radio, thermostat, light source, security system, and the like. In an aspect, the target device can be the first and/or second detection devices.

Figure 5:
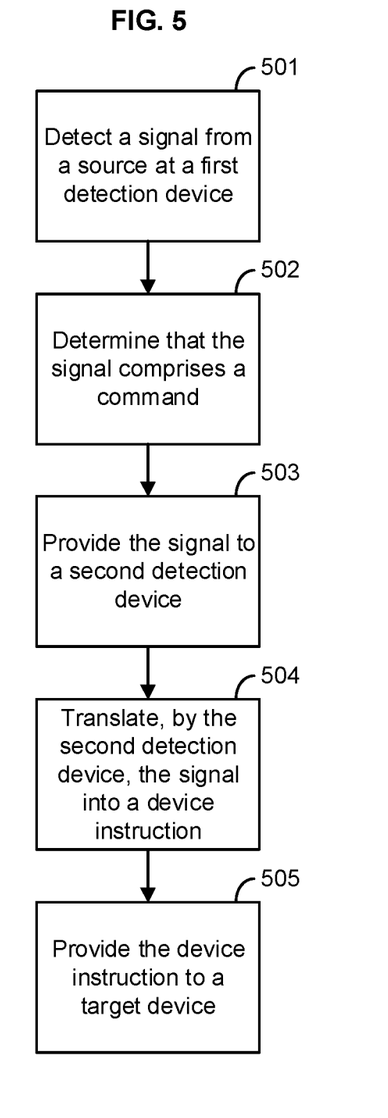
FIG. 5 is another exemplary process flowchart.

In an aspect, illustrated in FIG. 5, provided are methods for ambient system control, comprising detecting a signal from a source at a first detection device at 501, determining that the signal comprises a command at 502, providing the signal to a second detection device at 503, translating, by the second device, signal into a device instruction at 504, and providing the device instruction to a target device at 505. The signal can be an audio signal, gesture, combination thereof and the like.

Determining that the signal comprises a command can comprise comparing the signal to a set of activation commands. The signal can comprise an activation command, an action command, or combination thereof. An activation command can comprise, for example, an audio signal representing a product brand name such as Company X, or specific musical melodies and jingles. Care can be taken when choosing activation commands to ensure that they are recognizable when deliberately uttered, but not easily mistakenly detected. Other examples of potential activation commands include: a finger snap, distinguished by synchronized detection of both its finger movement and its distinct sound; large body movements (such as standing up, sitting down, and the like); and small body movements (such as hand gestures, head nods, and the like). An action command can comprise: changing a channel, changing the volume, requesting the display of more information about content consumed, requesting desired information about a topic, interacting with a guide, turning a system on and/or off, recording content, initiating communication (e.g., phone call, text message, e-mail, and the like), ordering goods or services, and the like.

In an aspect, the first detection device can be connected to a continuous power source. In a further aspect, the first detection device can be coupled to a power source with higher available power relative to a power source coupled to a second detection device. In an aspect, the first detection device can comprise a plurality of detection devices. The plurality of detection devices can comprise a mixture of devices, such as both a microphone and a camera, and the like. In an aspect, the first detection device can be configured for lower quality sound and/or gesture recognition capability, relative to a second detection device.

In a further aspect, a second detection device can be activated as a result of the first detection device detecting a command The second detection device can be a detection device proximate to the source. In an aspect, activating a second detection device can comprise causing the second detection device to exit a low power (standby) mode. Determining the detection device proximate to the source can comprise identifying a user issuing a command and activating devices associated with the user. In another aspect, determining the detection device proximate to the source can comprise activating one or more devices known to be in the vicinity of the target device. Activating a second detection device proximate to the source can further comprise activating one or more of, a microphone, a motion sensor, or a camera in the second detection device.

In an aspect, the second detection device can be battery powered. In a further aspect, the second detection device can be coupled to a power source with lower available power relative to a power source coupled to the first detection device. The second detection device can comprise a plurality of devices. The plurality of devices can comprise a mixture of devices, such as both a smartphone and a camera, and the like. The second detection device can be one or more of a remote control, a smartphone, a battery powered microphone, a camera, a portable computer, and the like. In an aspect, the second detection device can be configured for higher quality sound and/or gesture recognition capability, relative to the first detection device.

Providing the signal to a second detection device can comprise transmitting the signal over a wired and/or wireless network, such as a LAN and/or the Internet, or directly between the first and second detection devices. Translating, by the second detection device, the signal into a device instruction can comprise identifying the command as speech or a gesture corresponding to a particular command for a target device. A device instruction associated with the particular command can be determined based on a pre-determined set of device instructions that can be executed by a target device. In an aspect, the translation by the second device can comprise transmission of the command to another device for further processing, such as a remote computer, such as a server connected to one or more of the target device, first detection device, and/or second detection device by way of a network connection. The network can be wired or wireless. In an aspect, the network can be the Internet.

Providing the device instruction to a target device can comprise transmitting the device instruction through a network directly to the target device or from one or more of the first or second detection devices via Infrared, RF, and the like. The target device can comprise one or more of a TV, DVR, set top box, radio, thermostat, light source, security system, and the like. In an aspect, the target device can be the first and/or second detection devices.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   detecting, by a first detection device, an audio signal generated by a user;
   determining that the audio signal comprises an activation command;
   determining, based on the audio signal, a second detection device of a plurality of available detection devices configured to send a command to a target device, to receive the activation command;
   sending, from the first detection device to the second detection device and based on the activation command, an activation signal, wherein the activation signal causes the second detection device to activate; and
   detecting, by the second detection device, a user command, associated with the target device, based on a received command signal.

2. The method of claim 1, wherein the activation command comprises one or more of a wake word, a keyword, a device name, or a function name.

3. The method of claim 1, further comprising determining, based on the activation command, the received command signal.

4. The method of claim 1, wherein the first detection device is powered by a continuous power source and wherein the second detection device is powered by battery power.

5. The method of claim 1, wherein the first detection device is configured for lower fidelity audio signal detection relative to the second detection device.

6. The method of claim 1, wherein the received command signal is indicative of the user command and wherein the user command comprises the command to cause the target device to perform one or more of change a channel, adjust volume, power on, power off, adjust temperature, initiate an arm function, initiate a disarm function, retrieve further information, or initiate an application.

7. The method of claim 1, further comprising determining, by the second detection device and at a second processing level, the audio signal, wherein detecting the activation signal comprises a first processing level that is less active than the second processing level.

8. A method comprising:
   detecting, by a first detection device at a first processing level, an audio signal generated by a user;
   determining that the audio signal comprises an activation command;
   determining, based on the audio signal, a second detection device of a plurality of available detection devices configured to send a command to a target device, to receive the activation command;
   sending, from the first detection device to the second detection device and based on the activation command, an activation signal, wherein the activation signal causes the second detection device to activate and wherein the activation signal causes the second detection device to activate at a second processing level that is more active than the first processing level; and
   detecting, by the second detection device, a user command, associated with the target device, based on a received command signal.

9. The method of claim 8, further comprising determining, based on the activation command, the received command signal, wherein the activation command comprises one or more of a wake word, a keyword, a device name, or a function name to activate the second detection device, and wherein the second processing level comprises speech recognition processing.

10. The method of claim 8, further comprising changing, based on a timeout period, operation of the second detection device from the second processing level to the first processing level.

11. The method of claim 8, wherein the first detection device is powered by a continuous power source and wherein the second detection device is powered by battery power.

12. The method of claim 8, further comprising determining, from a vocal utterance, the audio signal, wherein the first detection device is configured for lower fidelity audio signal detection relative to the second detection device.

13. The method of claim 8, wherein the received command signal is indicative of the user command and wherein the user command comprises the command to cause the target device to perform one or more of change a channel, adjust a volume, power on, power off, adjust a temperature setting, initiate an arm function, initiate a disarm function, retrieve further information, or initiate an application.

14. The method of claim 8, wherein the second detection device comprises one or more of a remote control, a smartphone, a microphone, a camera, or a portable computer.

15. A method comprising:
   detecting, by a first detection device, a first portion of an audio signal generated by a user;
   determining that the first portion of the audio signal comprises an activation command;
   determining, based on the first portion of the audio signal, a second detection device of a plurality of available detection devices configured to send a command to a target device, to receive the activation command;
   sending, from the first detection device to the second detection device, based on the activation command, an activation signal, wherein the activation signal causes the second detection device to activate;
   detecting, by the second detection device, a second portion of the audio signal generated by the user; and
   determining, by the second detection device and based on the second portion of the audio signal, a user command associated with the target device.

16. The method of claim 15, wherein the activation command comprises one or more of a wake word, a keyword, a device name, or a function name.

17. The method of claim 15, wherein the activation signal causes the second detection device to activate at a second processing level that is more active than a first processing level of the first detection device.

18. The method of claim 17, wherein the second processing level comprises speech recognition processing.

19. The method of claim 15, wherein the first detection device is configured for lower fidelity audio signal detection relative to the second detection device.

20. The method of claim 15, wherein the user command comprises the command to cause the target device to perform one or more of change a channel, adjust a volume, power on, power off, adjust a temperature setting, initiate an arm function, initiate a disarm function, retrieve further information, or initiate an application.

* * * * *